S. M. DAVIS.
FISHING TRAP.

No. 188,503. Patented March 20, 1877.

Witnesses:
Arthur L. Kelley
Chas. D. Moore

Inventor:
Samuel M. Davis

UNITED STATES PATENT OFFICE.

SAMUEL M. DAVIS, OF LAWRENCE, MASSACHUSETTS.

IMPROVEMENT IN FISHING-TRAPS.

Specification forming part of Letters Patent No. 188,503, dated March 20, 1877; application filed December 14, 1876.

*To all whom it may concern:*

Be it known that I, SAMUEL M. DAVIS, of Lawrence, in the county of Essex and Commonwealth of Massachusetts, have invented certain new and useful Improvements in Fishing-Traps, which invention is fully described and set forth in the following specification and drawing.

The object of my invention is to construct a fishing-trap for fishing through the ice, or on floats, which shall be simple and durable in its construction and effective for the purpose hereinafter set forth.

My invention is designed more particularly for fishing on the ice, but may be used on floats.

In the fishing-tackle now commonly in use the line is so reeled that the same must be wholly unreeled and coiled or laid about on the ice, thereby rendering the same liable to freeze or tangle, which interferes with the running of a line, and often causes a loss of fish and hook; but in my improved trap the line is reeled closely on a spool, and, when a fish is taken, unreels directly from the spool to the water, thereby avoiding the above-mentioned difficulty; and consists of a simple frame provided with a reel for a line, a flag-spindle with flag attached, having a spring designed to throw the same in an upright position when liberated from its set, a brad designed to secure the position of the same, and a guide for the line.

Figure 1:
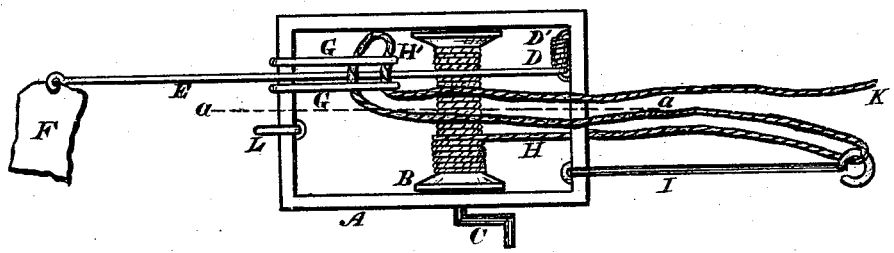
Figure 1:
Figure 2:
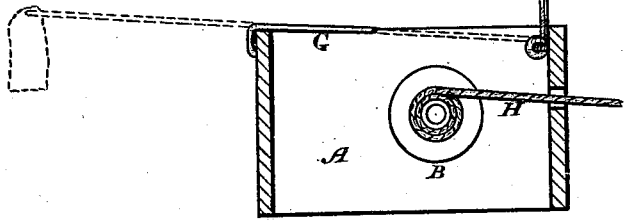

In the drawing, Figure 1 represents a top view of a trap, showing the same as set; and Fig. 2, a sectional view of a trap, showing the same when sprung, the dotted lines when set—section taken at *a* and *a*.

A represents a frame designed to hold the various parts of a trap, and serves as a base for the same; B, a spool or reel, designed to reel a line; C, a crank attached to the spool B; D, a spring designed to throw the flag-spindle E upright; D', a wire to which the spring D and the spindle E are pivoted; E, a flag-spindle pivoted to the frame A by the wire D', to which is attached the flag F; F, a flag attached to the spindle E; G G, two wires attached to the frame A, (as shown in Fig. 1,) and designed with a loop of the line, H', to set the spindle E; H, a fishing-line; H', a loop formed by bringing the line H under G G and over E; I, a wire guide designed to guide a line through the ice; K, end of line leading to hook, and L a brad or point designed to hold the trap securely to the ice or other substance.

To use my said invention, (first place the same near a fishing-hole,) first secure the trap by forcing the brad L into the ice. Then unreel from the spool any desired length of line. Bring the spindle E down between the wires G G. Then form a loop at any desired distance from a hook, and pass the line, if desired, through the guide I, as shown in Fig. 1. Pass the loop over the spindle E and under the wires G G, when the trap is fully set. When a fish has been secured to the hook, in his struggles to free himself the loop H' is drawn from its securing, and the spindle E left free to be thrown up by its spring D, and the line free to unreel, the flag announcing to the attendant that a fish has been taken.

Having thus described my said invention, I claim as new, and desire to secure by Letters Patent, the following, to wit:

In a fishing-trap, as herein described, the frame A, the spool B, its crank C, the spring D, the pivot D', the flag-spindle E, the wires G G, the line H, the guide I, and the anchoring-brad L, constructed and arranged to operate substantially as described.

SAMUEL M. DAVIS. [L. S.]

Witnesses:
ARTHUR L. KELLEY,
CHAS. D. MOORE.